(12) United States Patent
Hofer et al.

(10) Patent No.: US 9,070,979 B2
(45) Date of Patent: Jun. 30, 2015

(54) BOOSTER ANTENNA FOR A CHIP ARRANGEMENT, CONTACTLESS SMART CARD MODULE ARRANGEMENT AND CHIP ARRANGEMENT

(71) Applicant: Infineon Technologies AG, Neubiberg (DE)

(72) Inventors: Guenter Hofer, St. Oswald (AT); Gerald Holweg, Graz (AT); Walther Pachler, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/043,915

(22) Filed: Oct. 2, 2013

(65) Prior Publication Data

US 2014/0158775 A1 Jun. 12, 2014

(30) Foreign Application Priority Data

Oct. 2, 2012 (DE) .......................... 10 2012 109 359

(51) Int. Cl.
*G06K 19/06* (2006.01)
*H01Q 1/36* (2006.01)
*H04B 5/00* (2006.01)
*G06K 19/077* (2006.01)
*H01Q 7/00* (2006.01)
*H01Q 1/22* (2006.01)

(52) U.S. Cl.
CPC .. *H01Q 1/36* (2013.01); *H01Q 7/00* (2013.01); *H04B 5/0087* (2013.01); *G06K 19/07794* (2013.01); *H01Q 1/2225* (2013.01)

(58) Field of Classification Search
CPC ........................................................ G06K 7/086
USPC ......................................................... 235/492
See application file for complete search history.

(56) References Cited

U.S. PATENT DOCUMENTS

| 4,736,207 A * | 4/1988 | Siikarla et al. ................. 343/895 |
| 4,928,087 A * | 5/1990 | Kreft et al. .................. 340/10.34 |
| 2007/0188260 A1* | 8/2007 | Kawai .............................. 333/32 |

FOREIGN PATENT DOCUMENTS

EP 1031939 A1 8/2000

OTHER PUBLICATIONS

German Office Action; Mailed Jun. 28, 2013; 11 pages.

* cited by examiner

*Primary Examiner* — Jamara Franklin

(57) ABSTRACT

In various embodiments, a booster antenna for a chip arrangement, for example a smart card, is provided. The booster antenna can have: a first electrical circuit, which forms a first resonant circuit with a phase resonance; and a second electrical circuit, which forms a second resonant circuit with a phase resonance and/or absolute resonance; wherein the first electrical circuit and the second electrical circuit are coupled to one another.

24 Claims, 13 Drawing Sheets

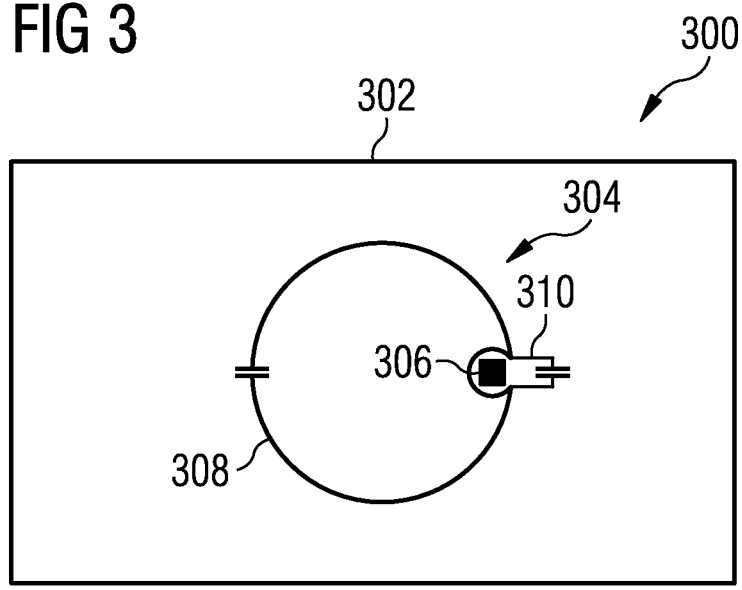
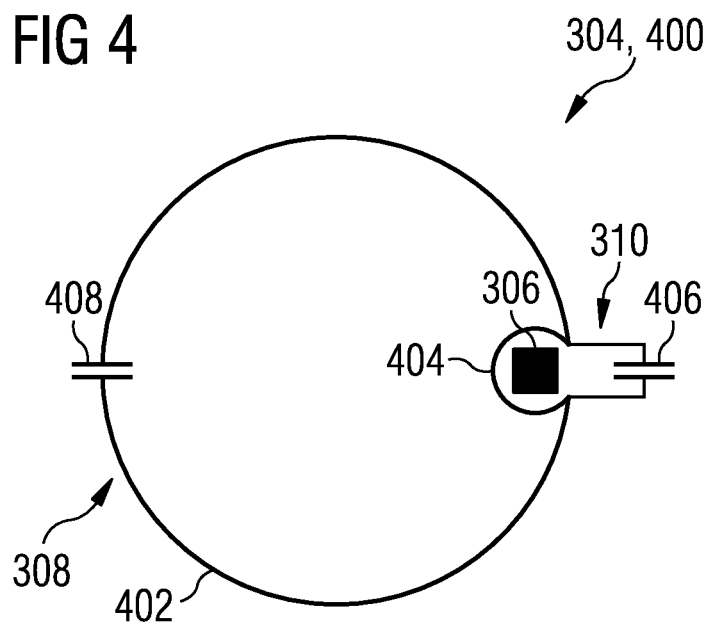

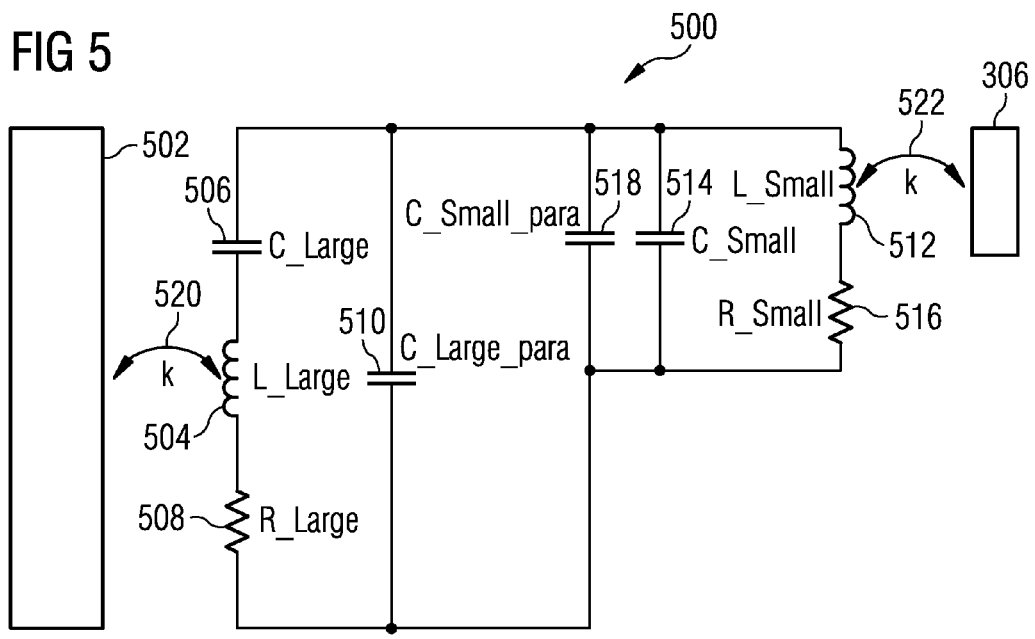
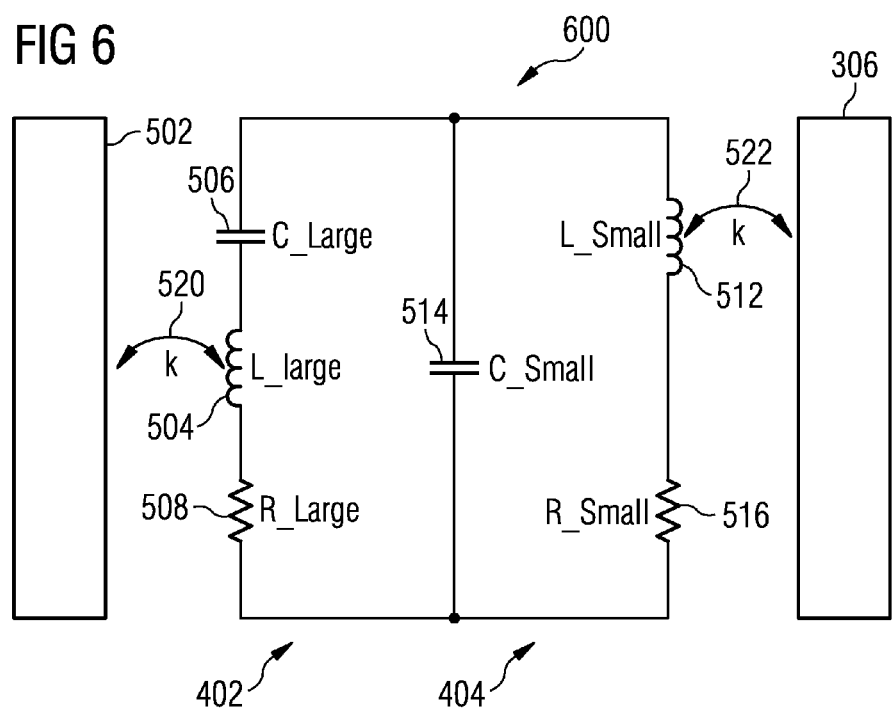

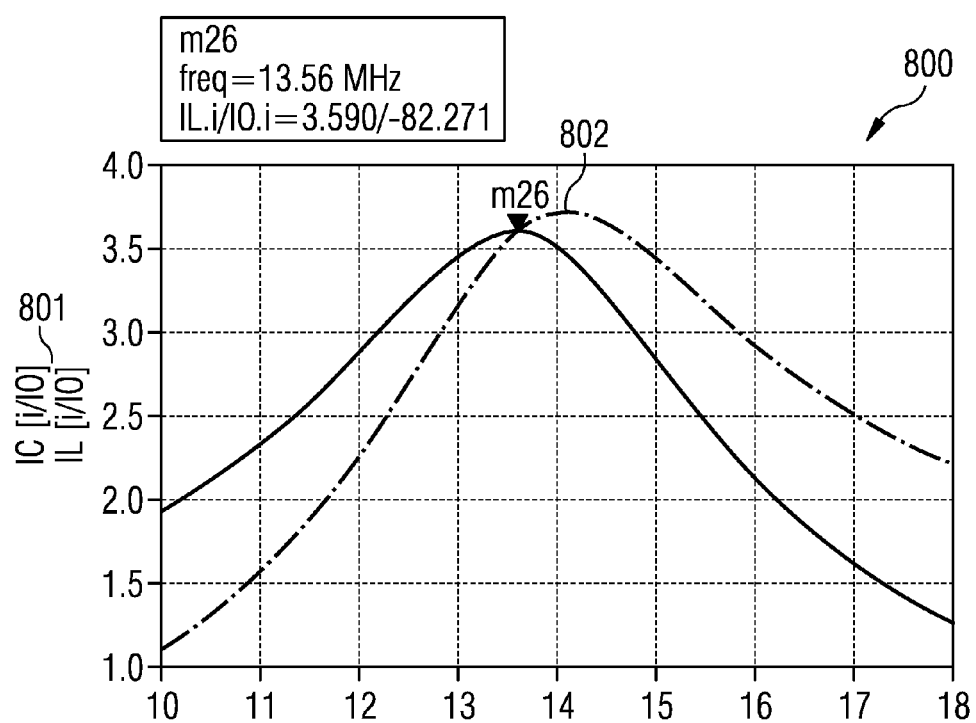

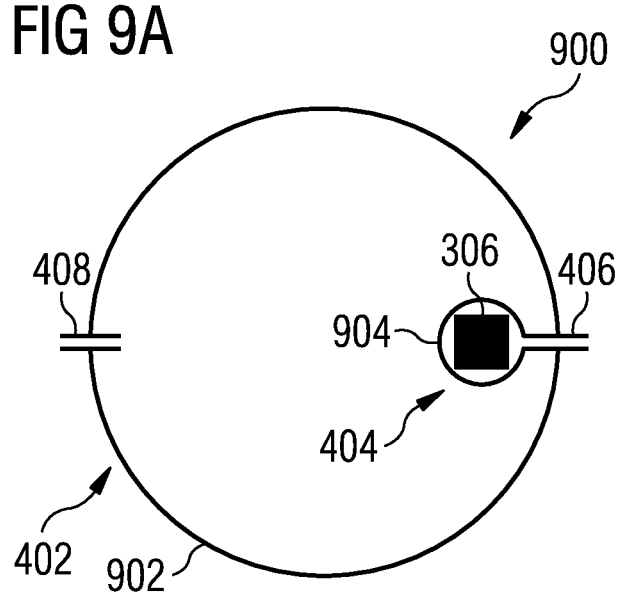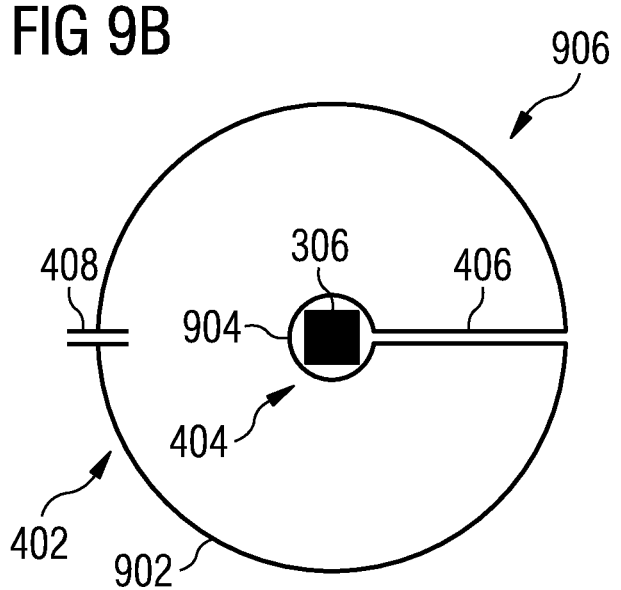

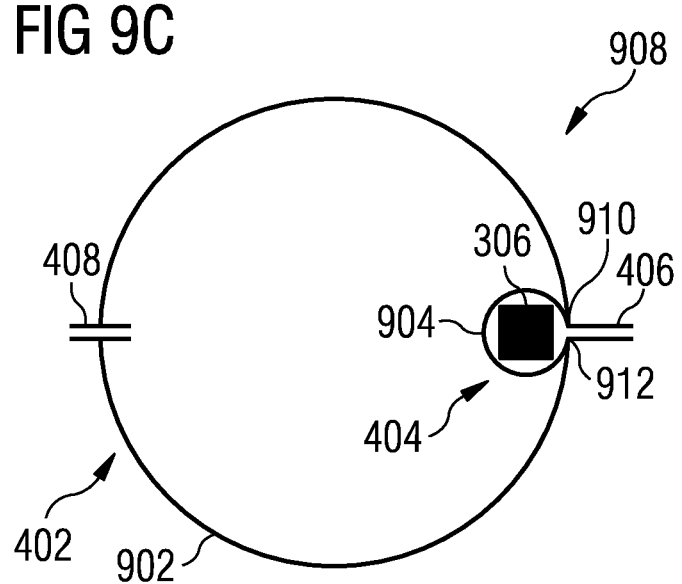
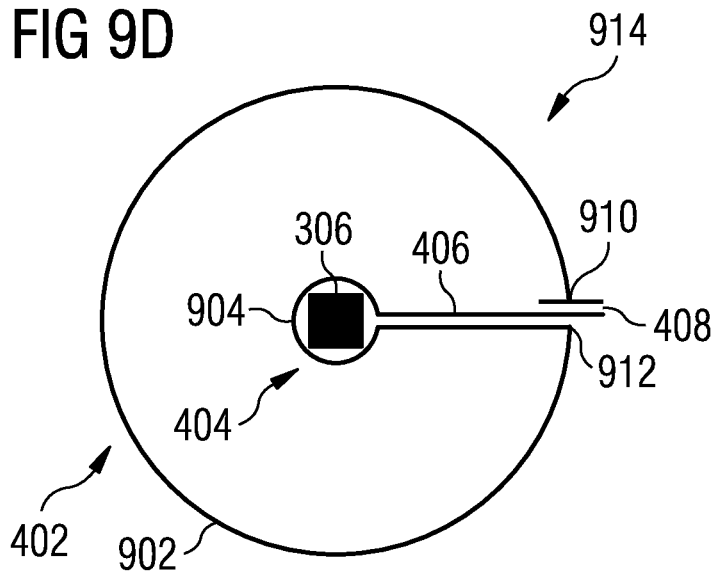

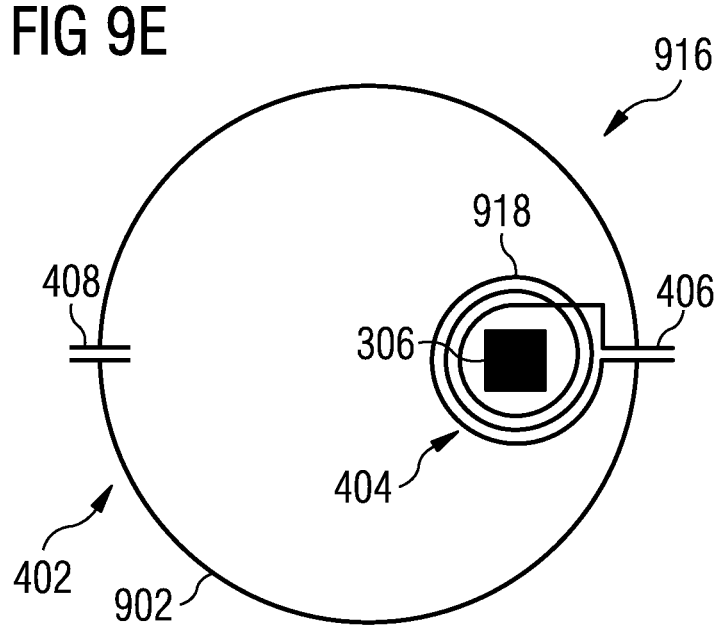
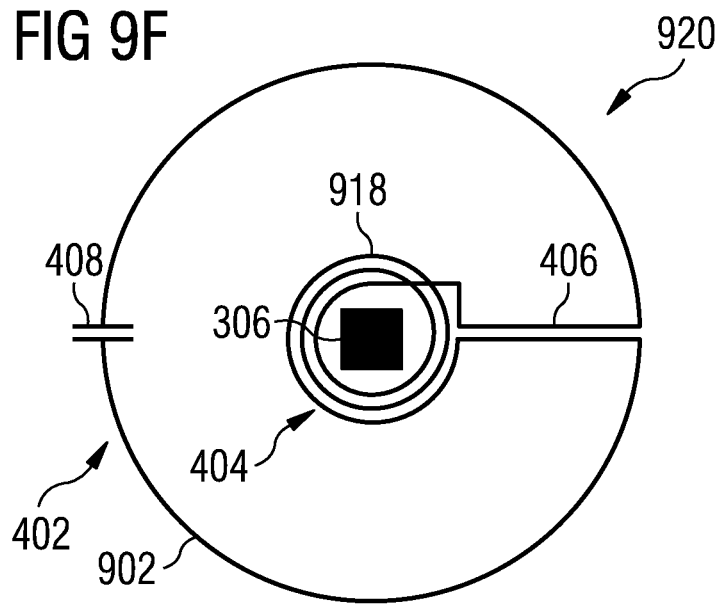

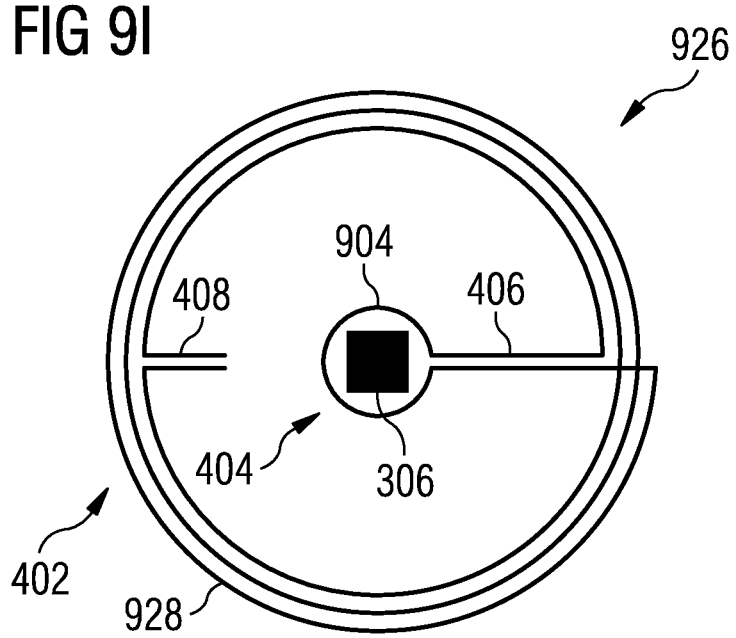
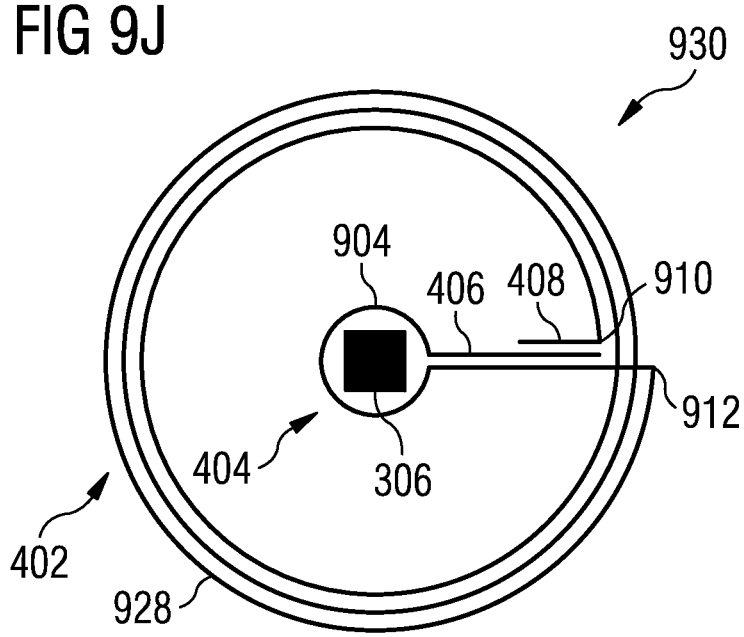

BOOSTER ANTENNA FOR A CHIP ARRANGEMENT, CONTACTLESS SMART CARD MODULE ARRANGEMENT AND CHIP ARRANGEMENT

CROSS-REFERENCE TO RELATED APPLICATION

This application claims priority to German Patent Application Serial No. 10 2012 109 359.8, which was filed Oct. 2, 2012, and is incorporated herein by reference in its entirety.

TECHNICAL FIELD

Various embodiments relate to a booster antenna for a chip arrangement, a contactless smart card module arrangement, and a chip arrangement.

BACKGROUND

In a conventional smart card which is in widespread use, for example, in the electronic payment transactions sector, the communication between the chip located on the smart card and a read device is contact-based, i.e. via smart card contacts exposed towards the outside of the smart card.

For this purpose, however, for use the smart card always needs to be singled out and inserted into a corresponding read device, which a user may find objectionable. A development which solves this problem provides so-called dual-interface smart cards, in which the chip, in addition to the conventional contact-based interface, can also communicate by means of a contactless interface. The contactless interface on the smart card can have a smart card antenna, which is contained in the smart card and is connected to the chip. The smart card antenna and the chip can be arranged together on a smart card module, in which case such a miniaturized form of the smart card antenna can then be referred to as a smart card module antenna. The joint arrangement of the coil and the chip on a smart card module is also referred to as CoM (coil on module). Irrespective of the type of smart card antenna, a galvanic connection is formed between said smart card antenna and the smart card module or the chip.

In an electronic payment system, for example, a functional distance of up to 4 cm between the chip and the read unit is required. However, meeting this setpoint input can prove to be problematic since, under certain circumstances, it is not possible for a sufficiently large smart card module antenna for enabling wireless communication at the required distance to be arranged on the small area which is available on the smart card module. In order to improve the performance of the contactless communication, in addition a so-called amplifier antenna (also referred to as booster antenna) can be built into a smart card and inductively coupled to the smart card module or the smart card module antenna arranged on the smart card module. Likewise, such a booster antenna can be inductively coupled to the CoM of a purely contactless smart card for improving the performance of the contactless communication. The booster antenna can be provided on a separate layer and contained in the smart card. The separate layer which contains the booster antenna may be or may have been laminated into the smart card during manufacture of the smart card, for example. The possible read or write distance between a write or read device and the smart card module is substantially increased by the booster antenna.

FIG. 1 shows a contactless smart card 100 with a smart card body 102, a booster antenna 104 integrated (for example laminated) therein and a contactless smart card module arrangement (for example also referred to as coil on module, CoM) 106, wherein the booster antenna 104 partially surrounds the contactless smart card module arrangement 106.

The booster antenna 104 is formed by a large ring-shaped conductor loop 108, wherein a small part of the conductor loop is formed to give a small conductor loop 110 which partially surrounds the contactless smart card module arrangement 106, for example a coil on module 106, which is arranged within a peripheral region of the large conductor loop 108.

FIG. 2 shows an associated (simplified) equivalent circuit diagram 200 illustrating that the conventional booster antenna 104 is a simple series resonant circuit 202. Said simple series resonant circuit includes an inductance 204 of the large conductor loop 108 ($L_{large}$), a capacitance 206 of the large conductor loop 108 ($C_{large}$), an ohmic resistance 208 of the large conductor loop 108 ($R_{large}$), and an inductance 210 of the small conductor loop 110 ($L_{small}$). A first inductive coupling (with corresponding coupling factor k) 212 to a read device (reader) (not illustrated in FIG. 2) takes place via the inductance 204 of the large conductor loop 108 ($L_{large}$); a second inductive coupling (k) 214 to the contactless smart card module arrangement 106, for example an on-chip antenna (OCA) or a chip on module (CoM), takes place via the inductance 210 of the small conductor loop 110 ($L_{small}$).

A conventional booster antenna is generally a simple series resonant circuit. In this case, a large conductor loop is used for inductively coupling in energy. In order to achieve a booster effect (amplifier effect), a small part of this conductor loop is formed to give a further, small conductor loop, which surrounds a CoM. The geometric approximation of the small conductor loop and the CoM results in good coupling between these components. The nearer and more similar the small conductor loop of the booster antenna and the antenna of the CoM are with respect to one another, the better the coupling factor thereof is.

A booster antenna of this type is, however, complicated in terms of manufacture and difficult to verify. Furthermore, parameterization of the so-called loading effect plays a significant role in the design process.

The writing and reading of very small CoMs requires high field intensities and/or small distances between the write/read device and the smart card module even when using a conventional booster antenna, however.

SUMMARY

In various embodiments, a booster antenna for a chip arrangement, for example a smart card, is provided. The booster antenna can have: a first electrical circuit, which forms a first resonant circuit with a phase resonance; and a second electrical circuit, which forms a second resonant circuit with a phase resonance and/or absolute resonance; wherein the first electrical circuit and the second electrical circuit are coupled to one another.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a smart card with a booster antenna in accordance with various embodiments;

FIG. 4 shows a booster antenna in accordance with various embodiments;

FIG. 5 shows a real equivalent circuit diagram of the booster antenna shown in FIG. 4;

FIG. 6 shows a simplified equivalent circuit diagram of the booster antenna shown in FIG. 4;

FIG. 8 shows the ratio of the currents which flow in the second circuit to the current which is induced in the first circuit, given a corresponding Q factor of the second resonant circuit (in a current graph);

DESCRIPTION

Figure 1:
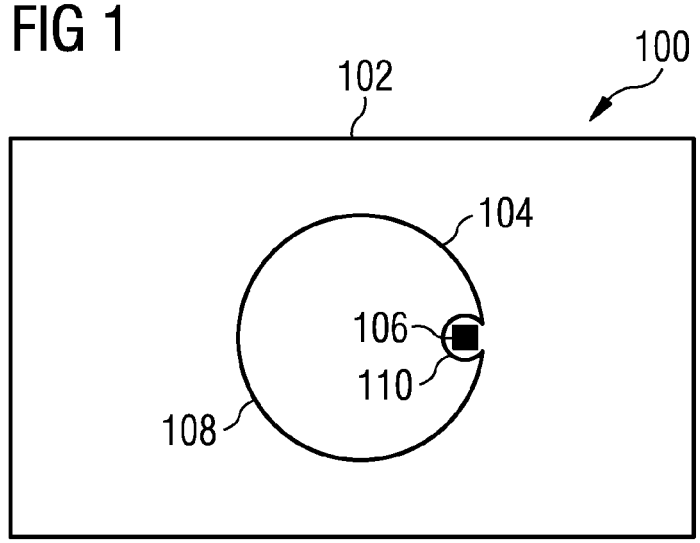
FIG. 1 shows a smart card with a conventional booster antenna.
Figure 2:
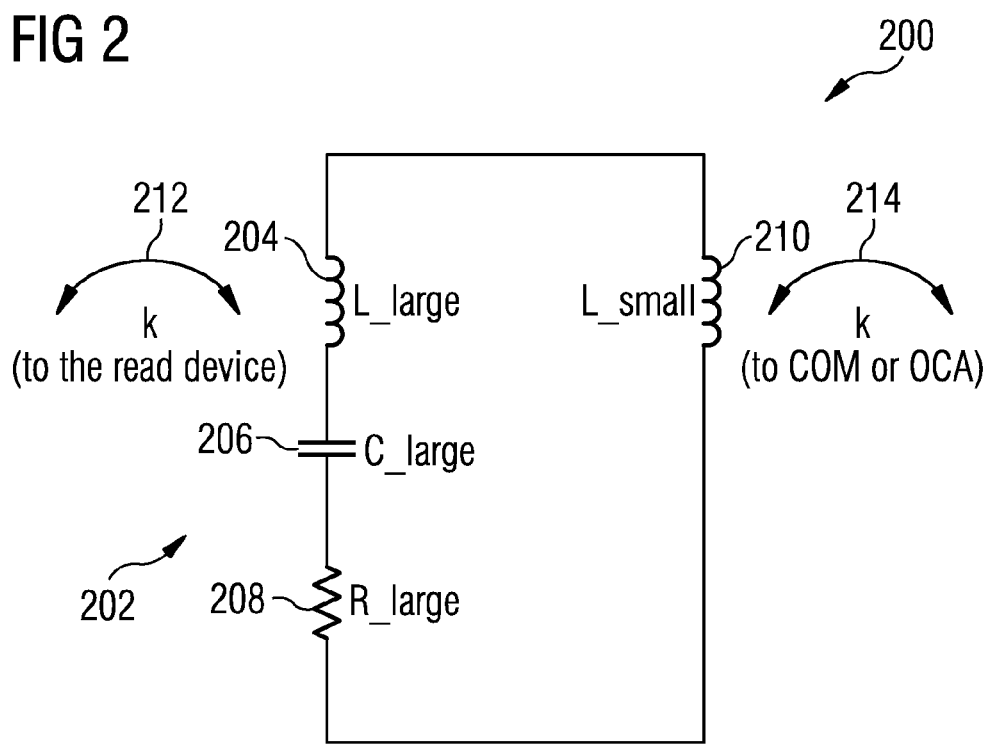
FIG. 2 shows an electrical equivalent circuit diagram of the conventional booster antenna.

In the following detailed description, reference is made to the attached drawings, which form part of this description and in which specific embodiments are shown, for illustrative purposes, in which the invention can be implemented. In this respect, directional terminology such as "at the top", "at the bottom", "at the front", "at the rear", "front", "rear", etc. is used with reference to the orientation of the described figure(s). Since components from embodiments can be positioned in a number of different orientations, the directional terminology is used for illustrative purposes and is in no way restrictive. It goes without saying that other embodiments can be used and structural or logic amendments can be made without departing from the scope of protection of the present invention. It goes without saying that the features of the various embodiments described herein can be combined with one another if not specifically specified otherwise. The following detailed description should therefore not be interpreted in a restrictive sense, and the scope of protection of the present invention is defined by the attached claims.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the context of this description, the terms "connected" and "coupled" are used to describe both a direct and an indirect connection and a direct or indirect coupling. In the figures, identical or similar elements have been provided with identical reference symbols, where expedient.

In various embodiments, a booster antenna for a chip arrangement, for example a smart card, is provided. The booster antenna can have: a first electrical circuit, which forms a first resonant circuit with a phase resonance; and a second electrical circuit, which forms a second resonant circuit with a phase resonance and/or absolute resonance; wherein the first electrical circuit and the second electrical circuit are coupled to one another.

The chip arrangement may be any desired arrangement which has a chip, for example a portable arrangement with a chip. The booster antenna may be arranged, for example, on a flexible carrier as well, for example on a textile carrier, for example on a patch (for example an adhesive patch).

By corresponding dimensioning and design of the individual components of the first electrical circuit and/or the second electrical circuit, a multiplicity of possible application cases is provided. Both the first and the second resonant circuit can be adjusted very easily to a specific phase resonance or absolute resonance by corresponding dimensioning of the circuit components. By virtue of the separate design, in addition the parameterization and verification of the booster antenna is considerably simplified.

In one configuration, the first electrical circuit and the second electrical circuit may be designed such that the first phase resonance and the second absolute resonance are identical. The respective resonances of the circuits can also be dimensioned differently, however.

As a result of the fact that the first electrical circuit and the second electrical circuit are coupled to one another, it is possible, for example, to cause the first electrical circuit to oscillate externally, for example by inductive or capacitive coupling, as a result of which the second electrical circuit, caused by the coupling to the first electrical circuit, can likewise be excited so as to oscillate.

It is thus possible, for example, to design and dimension the components of the circuits in such a way that it is possible to cause the first tuned circuit (in other words the first resonant circuit) to oscillate with an external, weak electromagnetic field, for example to set it to phase resonance or absolute resonance. The latter case would result in the magnitude of the impedance of the first series resonant circuit being at a minimum and the current induced in the first resonant circuit being at a maximum. The second circuit can likewise be excited by the first circuit being coupled to the second circuit. If the second tuned circuit is in the form of a parallel resonant circuit, for example, an increase in current occurs within the circuit. These currents in the branches of the parallel resonant circuit may be a great deal higher than the excitation current corresponding to the Q factor of the circuit.

As a result, in addition to the conventional geometric booster effect, an electromagnetic property which results in an electrical booster effect is also utilized.

Various embodiments make it possible, by virtue of the separate design of two resonant circuits (for example a series resonant circuit and a parallel resonant circuit) which have the same phase resonance and/or absolute resonance, for example, for current maximization to be produced subsequently given a corresponding Q factor of the parallel resonant circuit, which current maximization results in an intensified magnetic field of a coupling structure for example to a contactless chip arrangement, for example to a contactless smart card module (coil on module, CoM), and therefore in improved communication.

In various configurations, there can be inductive coupling to a contactless chip arrangement, for example to a smart card module, for example a CoM, between a second coil of a second circuit. With the above-described current maximization in the second resonant circuit, the magnetic field can be intensified proportionally in the coupling structure to a contactless chip arrangement, for example to a smart card module, for example a CoM, and thus improved communication can be enabled.

In yet a further configuration, the first electrical circuit and the second electrical circuit can be designed such that the first phase resonance (and/or the first absolute resonance) and/or the second phase resonance (and/or the second absolute resonance) are/is approximately 13.56 MHz.

In yet a further configuration, the second resonant circuit can be a parallel resonant circuit.

In various configurations, the first resonant circuit and the second resonant circuit may be connected in series with one another, wherein the first resonant circuit is, for example, a series tuned circuit, and the second resonant circuit is, for example, a parallel resonant circuit. For example, however, both the first resonant circuit and the second resonant circuit may also be a series tuned circuit or a parallel tuned circuit.

In yet another configuration, the second electrical circuit may have an inductive coupling structure.

In yet another configuration, the first electrical circuit may include or consist of a series circuit including a first inductance, a first capacitance and a first ohmic resistance.

In yet another configuration, the second electrical circuit may include or consist of a parallel circuit comprising a second capacitance and a series circuit, wherein the series circuit may include or consist of a second ohmic resistance and a second inductance.

In yet another configuration, the series circuit including the first inductance, the first ohmic resistance and the first capacitance may be connected in series with the second capacitance.

In yet another configuration, the first resonant circuit and the second resonant circuit may be designed such that a first current in the first resonant circuit effects an increased second current, in comparison with the first current, in the second resonant circuit.

In yet another configuration, the first ohmic resistance may be formed by the ohmic resistance of the first inductance.

In yet another configuration, the second ohmic resistance may be formed by the ohmic resistance of the second inductance.

In yet another configuration, the first inductance may be designed as a conductor loop.

In yet another configuration, the second inductance may be designed as a conductor loop.

In yet another configuration, the first inductance may be designed as a coil.

In yet another configuration, the second inductance may be designed as a coil.

In yet another configuration, the first capacitance may be designed as a plate capacitor.

In yet another configuration, the second capacitance may be designed as a plate capacitor.

In yet another configuration, the plate capacitor may be formed by two conductor tracks running parallel to one another.

In yet another configuration, the conductor tracks running parallel to one another may be shaped to form a planar spiral.

In various embodiments, a contactless chip arrangement, for example a contactless smart card module arrangement, which may have a booster antenna is provided, as has been described above or is yet to be described below. In addition, the contactless chip arrangement, for example the contactless smart card module arrangement, may have a contactless chip module, for example a contactless smart card module. The contactless chip module, for example the contactless smart card module, may have a chip; and a coil, which is electrically coupled to the chip; wherein the booster antenna is inductively coupled to the coil of the contactless chip module, for example the contactless smart card module, by means of at least one inductive coupling region of the booster antenna.

The chip may have any desired electronic circuit, including logic and/or memory components.

In one configuration, at least part of the second electrical circuit of the booster antenna forms an inductive coupling region for coupling to an antenna of a chip module, for example a smart card module. The inductive coupling region may be provided, for example, by the formation of a conductor loop or a coil. For example, the shape of the conductor loop or the coil of the inductive coupling region of the booster antenna can correspond to or approximate the shape of the antenna of the contactless chip module, for example the contactless smart card module. Furthermore, provision may be made for the dimensions, in other words the size dimensions, of the conductor loop or the coil of the inductive coupling region of the booster antenna to also correspond to or at least approximate the shape of the antenna of the contactless chip module, for example the contactless smart card module. An improvement in the coupling between the booster antenna and the contactless chip module, for example the contactless smart card module, may also be achieved if the conductor loop or the coil of the inductive coupling region of the booster antenna tightly surrounds or is arranged congruently above or beneath the antenna of the contactless chip module, for example the contactless smart card module, with the result that a magnetic field produced by the coil or the conductor loop passes through the coil of the contactless chip module, for example the contactless smart card module, as efficiently as possible.

In one configuration, the booster antenna may have at least one further coupling region for coupling to a write and/or read device.

In yet another configuration, the contactless chip module, for example contactless smart card module, may be a module with an integrated coil (coil on module, CoM) or a module with an integrated antenna (on-chip antenna, OCA).

In yet another configuration, the contactless chip module with an integrated coil (coil on module, CoM) or a module with an integrated antenna (on-chip antenna, OCA) may have a predeterminable, preferably predefined, specific distance from the coupling element of the booster antenna.

In yet another configuration, the contactless chip module with an integrated coil (coil on module, CoM) or a module with an integrated antenna (on-chip antenna, OCA) may be located in a different matter (for example may be implanted in a muscle or in the body).

In yet another configuration, the first electrical circuit may form a coupling region for coupling to a write and/or read device.

In yet another configuration, the inductive coupling region may be part of the second electrical circuit; wherein the inductive coupling region may be arranged substantially congruently with the contactless chip module, for example the contactless smart card module.

In yet another configuration, the inductive coupling region may be formed by a conductor loop.

In yet another configuration, the inductive coupling region may be formed by a coil.

In yet another configuration, the coupling region for coupling to a write and/or read device may be formed by a conductor loop.

The size of the conductor loop or the coil may be limited in various embodiments substantially by the outer dimensions of a carrier substrate, i.e., for example, the chip arrangement, for example the smart card, itself. In order to obtain a maximum area through which the alternating electromagnetic field passes, the shape of the conductor loop or coil may be matched to the shape of the conductor loop or the chip arrangement, for example the smart card. In addition, in respect of the configuration of the shape and size of the conductor loop or coil, standards such as ISO 7816, for example, can be taken into consideration which define regions which need to be kept free of electrical components such as conductor tracks to provide space for writing, imprints or the like on the cards.

In yet another configuration, the coupling region for coupling to a write and/or read device can be formed by a coil.

In yet another configuration, the winding direction of the coils may be in the same direction.

In yet another configuration, the coupling region for coupling to a write and/or read device may be formed by a dipole.

In yet another configuration, the inductive coupling region of the booster antenna for coupling to a chip may be arranged completely within the further coupling region for coupling to a write and/or read device.

In yet another configuration, the inductive coupling region of the booster antenna for coupling to a chip may be arranged completely outside the further coupling region for coupling to a write and/or read device.

In yet another configuration, the contactless chip module, for example the contactless smart card module, may also have chip arrangement contacts, for example smart card contacts, which are designed to provide a contact-based chip arrangement interface, for example smart card interface.

Thus, in yet another configuration, the contactless chip arrangement, for example contactless smart card module arrangement, may be designed as a dual-interface contactless chip arrangement, for example as a dual-interface smart card module arrangement.

In various embodiments, a chip arrangement, for example a smart card, is provided which may have a contactless chip module arrangement, for example a contactless smart card module arrangement, as has been described above or as is yet to be described below.

In yet another configuration, the at least one inductive coupling region of the booster antenna may be arranged in a corner region of the booster antenna.

By virtue of being arranged correspondingly physically close to one another, the booster effect may be combined with the booster effect according to various embodiments, and therefore the read or write distance can be considerably increased.

One consequence may be that the markedly increased current, as a result of the inductance of the second resonant circuit, generates locally, i.e. in the region of the inductance of the second resonant circuit, a magnetic field having a field intensity which is much greater than that of the transmission or reception device in the other regions of the booster antenna. In turn, coupling to a coil on module (CoM) or to an on-chip antenna (OCA) is performed via this magnetic field.

Thus, with the booster antenna according to various embodiments, data transmissions between a chip module, for example a smart card module, and a write/read device are possible over distances at which no data transmission has previously been possible owing to the weakening of the alternating electromagnetic field emitted by the write/read device and poor coupling associated therewith.

Furthermore, with the booster antenna according to various embodiments, chip modules, for example smart card modules, for example CoMs and OCAs with particularly small dimensions, i.e. with likewise particularly small coil or antenna, can also be read since, owing to the design, these require relatively high field intensities for sufficient coupling.

It is evidently therefore possible in various embodiments to provide both for the first resonant circuit and the second resonant circuit to have the same resonant frequency and for them to be coupled to one another. This means that, in the case of excitation of the first resonant circuit, for example by a write/read device, this first resonant circuit excites the second resonant circuit.

In various embodiments, in addition to the geometrical booster effect (large coil on small coil), in addition current maximization of the small coupling structure can be achieved (evidently an additional booster effect), as a result of which the magnetic field is intensified in the coupling structure and improved communication is enabled.

FIG. 3 shows a smart card 300 in accordance with various embodiments.

It should be noted that even if various embodiments are explained with reference to a smart card, alternative embodiments may also be provided in other application areas. Thus, for example, the booster antenna may also be arranged on a different carrier, for example a flexible carrier, for example a textile carrier (for example a patch, for example an adhesive patch). The chip module also does not necessarily need to be implemented as a smart card module, but may be, for example, a chip module which may be implanted beneath the skin of a living being, for example.

The smart card 300 has a smart card body 302 and a booster antenna 304 in accordance with various embodiments, as will be explained in more detail below. In addition, the smart card 300 has a contactless smart card module 306, for example an on-chip antenna (OCA) or a chip on module (CoM).

The contactless smart card module 306 may have a chip and a coil, which is electrically coupled to the chip, for example by means of a conductor track. The booster antenna 304 can be inductively coupled to the coil of the contactless smart card module 306 (also referred to as contactless smart card module) by means of at least one inductive coupling region of the booster antenna 304, as will be explained in more detail below. In addition, the booster antenna 304 may have at least one further coupling region for inductive coupling to a write and/or read device.

The smart card 300 and therefore also the contactless smart card module arrangement may be designed as a purely contactless smart card module arrangement. Alternatively, the smart card 300 and therefore also the contactless smart card module arrangement may additionally have a contact-based smart card interface, for example in the form of smart card contacts (for example in accordance with ISO 7816), and may therefore be designed as a dual-interface smart card module arrangement.

The booster antenna 304 may have a first electrical circuit 308, which forms a first resonant circuit with a first phase resonance, and a second electrical circuit 310, which forms a second resonant circuit with a second absolute resonance. The first electrical circuit 308 and the second electrical circuit 310 are coupled, for example electrically, to one another.

FIG. 4 shows the booster antenna 304, 400 in accordance with various embodiments.

In accordance with these embodiments, the first electrical circuit 308 has the same structure as that described in connection with FIG. 3.

The booster antenna 400 has substantially two conductor loops 402, 404, namely a large conductor loop 402 and a small conductor loop 404. The small conductor loop 404 surrounds the CoM 306 or the OCA 306. The large conductor loop 402 is electrically conductively connected with its ends to the ends of the small conductor loop 404 and partially surrounds the small conductor loop 404. A second capacitor 406, which is part of the second electrical circuit 310, is connected in parallel with the ends of the two conductor loops 402, 404. In addition, the large conductor loop 402 has, in its left-hand region, a first capacitor 408, which is connected in series.

Therefore, the booster antenna 400 has a separate design of two resonant circuits (a series resonant circuit (formed by the first electrical circuit 308) and a parallel resonant circuit (formed by the second electrical circuit 310)), which can have the same phase resonance and absolute resonance. If the second tuned circuit is in the form of a parallel resonant circuit, for example, a current increase takes place within the circuit. These currents in the branches of the parallel resonant circuit may be a great deal greater than the input current, corresponding to the Q factor of the circuit. In simple terms, the series resonant circuit (also referred to as the series tuned circuit), in which the current is induced, supplies power to the parallel resonant circuit (also referred to as the parallel tuned circuit), in which a renewed increase in current then takes place. This increase in current may be proportional to the Q factor of the respective parallel tuned circuit.

FIG. 5 shows a real equivalent circuit diagram 500 of the booster antenna 400 shown in FIG. 4.

Furthermore, FIG. 5 shows a write/read apparatus 502, which is coupled inductively to the smart card 300 (by means of a first inductive coupling 520) and is therefore coupled, by means of the booster antenna 304, 400, in turn inductively, to the contactless smart card module 306 (by means of a second inductive coupling 522).

The real equivalent circuit diagram 500 of the booster antenna 400 shown in FIG. 4 has (on the coupling side with respect to the write/read apparatus 502) a first inductance ($L_{large}$) 504, a first capacitor ($C_{large}$) 506, a first ohmic resistance ($R_{large}$) 508 and a (negligible) first parasitic capacitance ($C_{large\_para}$) 510 of the large conductor loop, and a second inductance ($L_{small}$) 512, a second capacitor ($C_{small}$) 514, a second ohmic resistance ($R_{small}$) 516 and a (negligible) second parasitic capacitance ($C_{small\_para}$) 518 of the small conductor loop.

Disregarding the parasitic components gives the simplified equivalent circuit diagram 600 shown in FIG. 6.

The simplified equivalent circuit diagram 600 now only has the first inductance ($L_{large}$) 504, the first capacitor ($C_{large}$) 506, the first ohmic resistance ($R_{large}$) 508 of the large conductor loop, and the second inductance ($L_{small}$) 512, the second capacitor ($C_{small}$) 514, and the second ohmic resistance ($R_{small}$) 516 of the small conductor loop.

As can be seen from the simplified equivalent circuit diagram 600, the components in the large conductor loop form a series resonant circuit (in other words the first electrical circuit 402), and the components in the small conductor loop form a parallel resonant circuit (in other words the second electrical circuit 404); the series resonant circuit 402 is in this case connected in series with the capacitance of the parallel resonant circuit 404. The first inductive coupling (k) 520 to the write and/or read device (reader) 502 is performed via the first inductance 504 of the large conductor loop; the coupling to the CoM or the OCA, generally the contactless smart card module 306, is performed via the second inductance 512 of the small conductor loop.

The phase resonances of the tuned circuits 402, 404 can be determined using the following formulae:

$$fr_{small} = \frac{1}{2 \cdot p_i} \cdot \sqrt{\frac{1}{L_{small} C_{small}} - \frac{R_{small}^2}{L_{small}^2}}, \quad (1)$$

$$fr_{large} = \frac{1}{2 \cdot p_i \sqrt{L_{large} C_{large}}}. \quad (2)$$

In the present case, the two resonant circuits 402, 404 can be dimensioned such that the phase resonance for the series resonant circuit 402 and the absolute resonance for the parallel resonant circuit 404 is 13.56 MHz.

Figure 7A:
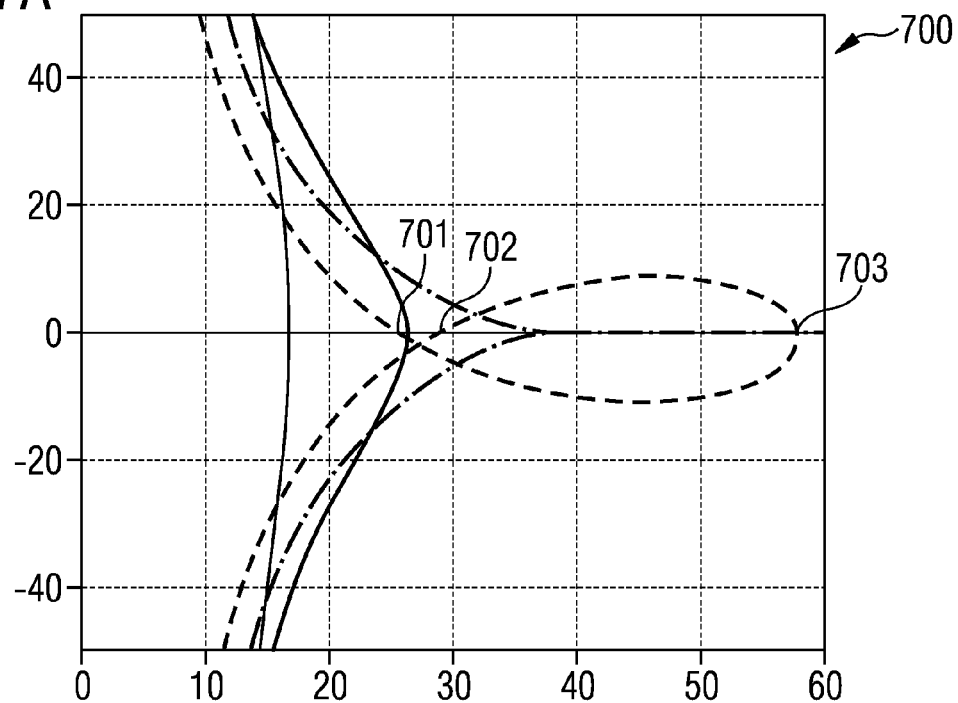
FIGS. 7A and 7B show the associated locus curves and the profile of the absolute value (in an absolute value graph) of the circuit illustrated in FIG. 6.
Figure 7B:
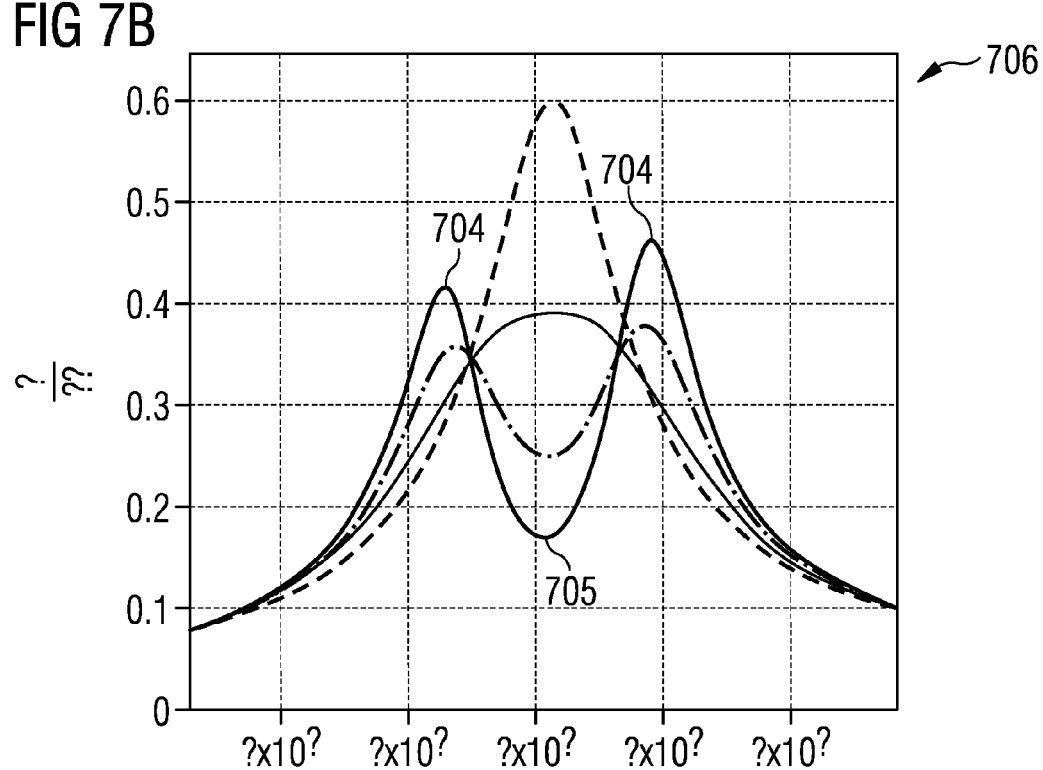

FIG. 7A and FIG. 7B show the associated locus curves in a locus curve graph 700, and the profile of the absolute value (in an absolute value graph 701) with different Q factors of the second tuned circuit. It can be seen that, above a specific Q factor of the second tuned circuit, up to three phase resonances (first phase resonance 701, second phase resonance 702 and third phase resonance 703) of the overall system are possible. This is also illustrated by means of extreme points of two peaks 704 and 705 in an absolute value graph 706.

The figures show that, in the second resonance case (first phase resonance 703 and associated absolute value minimum 705), the impedance now only has the real component. These points correspond to the operating frequency of the booster antenna. If the Q factor of the first series tuned circuit were to be changed, the curves illustrated in the locus curve graph 700 would shift along the x axis.

FIG. 8 shows a current graph 800. Here, the ratio of the currents 801 which flow in the second circuit (IL and IC) to the current which is induced in the first circuit is illustrated given a corresponding Q factor of the second resonant circuit.

FIG. 8 illustrates how the current in the coupling structure of the small inductance (second circuit 404) is markedly increased in comparison with the current in the large inductance (first circuit 402). The markedly increased current in the small conductor loop then brings about an intensified magnetic field, as a result of which the coupling to the contactless smart card module 306 is significantly improved.

The higher the Q factor of the second tuned circuit, the less the current maxima 802 are shifted with respect to the operating frequency. The ratio of the current rise 802 to the input current approximately corresponds to the Q factor of the second resonant circuit.

Figure 9G:
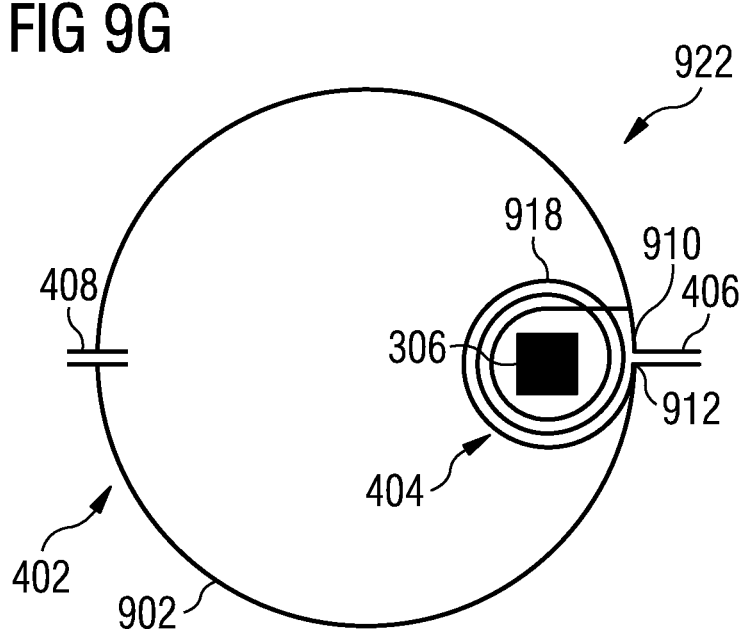
FIGS. 9A to 9O show booster antennas in accordance with various embodiments.
Figure 9H:
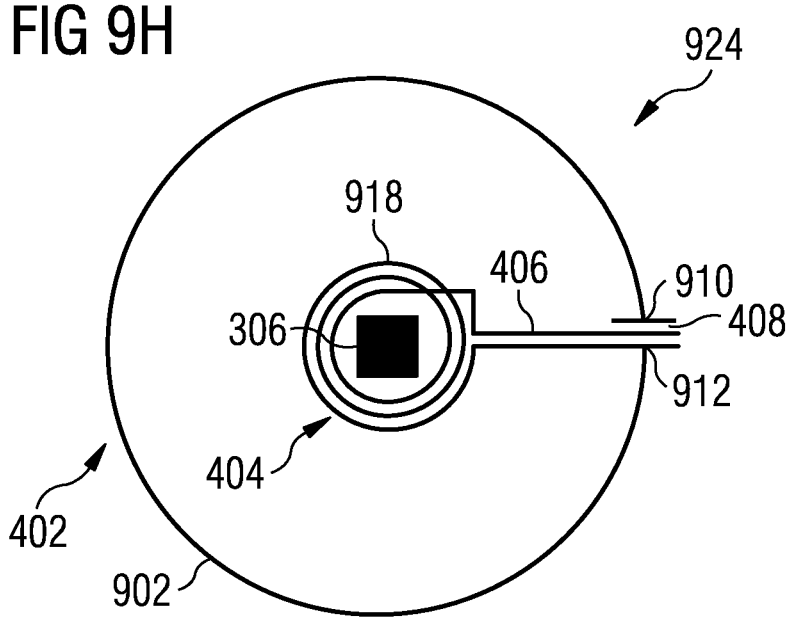
Figure 9K:
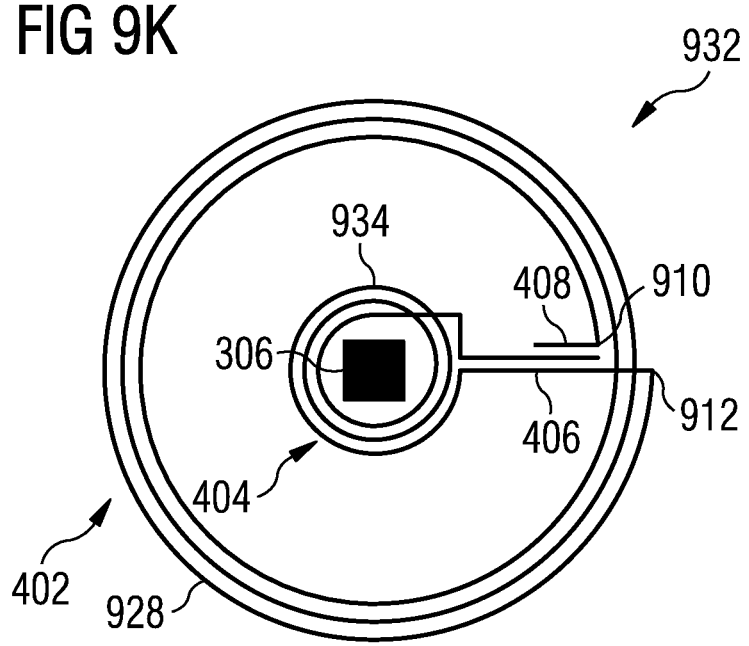
Figure 9L:
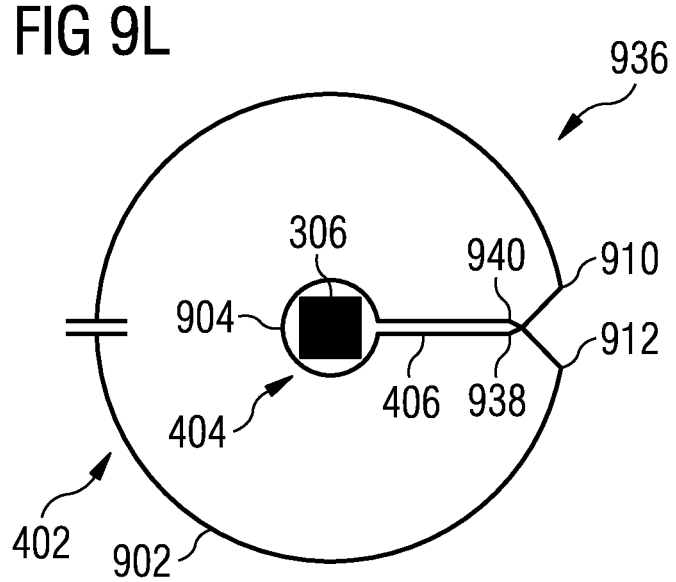
Figure 9M:
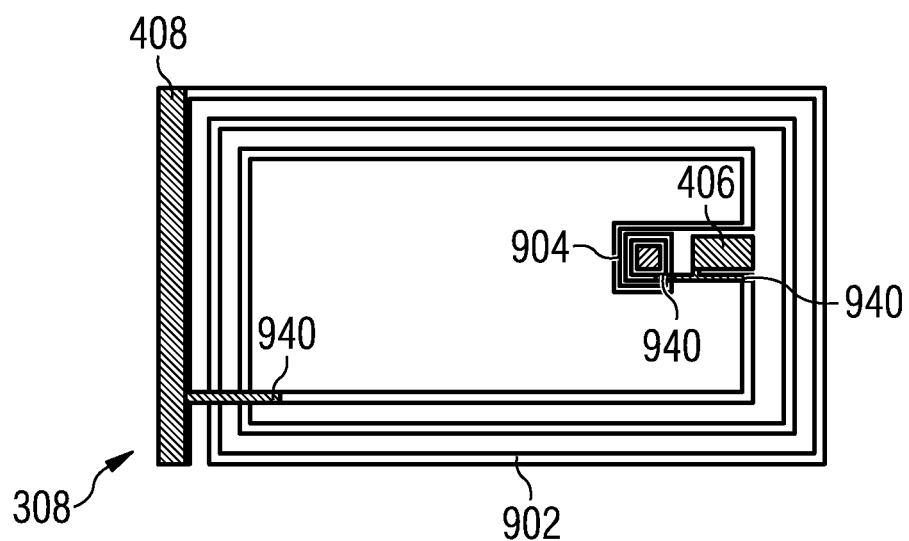
Figure 9O:
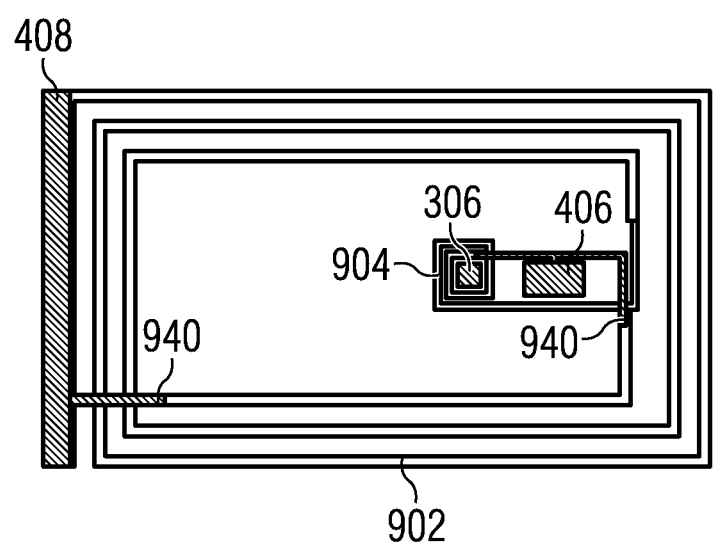

FIG. 9A to FIG. 9O show booster antennas in accordance with various embodiments.

FIG. 9A shows an embodiment of a contactless smart card module arrangement, in which the first inductance of the first coupling region of the first circuit 402 and the second inductance of the second coupling region of the second circuit 404 of the booster antenna 900 are each in the form of a conductor loop 902, 904 (a first, large conductor loop 902 and a second, small conductor loop 904), wherein the second conductor loop 904 of the second coupling region is arranged eccentrically within the first conductor loop 902. The first conductor loop 902 is interrupted in its left-hand region, wherein the ends of the first conductor loop 902 are shaped in the form of a T at the interruption point and therefore form a plate capacitor, namely the first capacitor 408. The ends of the conductor loops 902, 904 in the right-hand region of the booster antenna 900 are electrically conductively connected to one another via lines which run parallel to one another and which extend beyond the first conductor loop 902; the parallel running lines in turn form a plate capacitor, namely the second capacitor

406. The capacitance of this second capacitor 406 is the capacitance of the parallel resonant circuit.

FIG. 9B shows a further embodiment of a contactless smart card module arrangement with a booster antenna 906; this differs from the booster antenna described previously and shown in FIG. 9A substantially in that the smart card module 306 and the two conductor loops 902, 904 are arranged concentrically with respect to one another. The ends of the conductor loops 902, 904 are also in this case again connected to one another via lines which run parallel to one another, but these lines only extend within the first conductor loop 902, and not beyond the first conductor loop 902 as in the previously described example. However, in this case too, the parallel running lines form a plate capacitor, namely the second capacitor 406.

FIG. 9C shows a further embodiment of a contactless smart card module arrangement with another booster antenna 908; this differs from the booster antenna 900 described in FIG. 9A substantially in that the smart card module 306 and the second conductor loop 904 surrounding this smart card module are arranged further towards the outside, in other words closer to the inner rim of the first conductor loop 902. The ends of the first conductor loop 902 and the second conductor loop 904 are therefore connected directly to one another. In addition, another two lines running parallel to one another (also referred to as spur lines in the text which follows), which together form a capacitor, extend beyond the second conductor loop 904, wherein a spur line is connected to a first end 910 of the first conductor loop 902 and the second conductor loop 904, and the second spur line is connected to a second end 912 of the first conductor loop 902 and the second conductor loop 904.

FIG. 9D shows a further embodiment of a contactless smart card module arrangement with yet another booster antenna 914; this differs from the booster antenna 900 described in FIG. 9A substantially in that the first conductor loop 902 is without interruption, and in that the first capacitor 408, which interrupted the first conductor loop 902 in the previously described configurations, is laid at the beginning or the end of the first conductor loop 902. The first end 910 of the first conductor loop 902 is in the form of a T, and the second end of the first conductor loop 902 is connected directly to the second end 912 of the second conductor loop 904 by means of a straight line. The second end 912 of the second conductor loop 904 is connected to a spur line, which runs parallel to the line which connects the second ends of the conductor loops 902, 904 to one another. The spur line runs beyond the first conductor loop 902 and ends at the right-hand end of the T-shaped formation of the first end 912 of the first conductor loop 902. The spur line forms, firstly with the line connecting the second conductor ends, and with the T-shaped end of the first conductor loop 902, a plate capacitor, namely the first capacitor 408.

FIG. 9E shows a further embodiment of a contactless smart card module arrangement with yet another booster antenna 916; this differs from the booster antenna 900 described in FIG. 9A substantially in that, instead of the second conductor loop 904, a coil 918 with a plurality of, for example three (alternatively two, four, five, six, seven or more), turns is provided.

FIG. 9F shows a further embodiment of a contactless smart card module arrangement with yet another booster antenna 920; this differs from the booster antenna 906 described in FIG. 9B substantially in that, instead of the second conductor loop 904, a coil 918 with a plurality of, for example three (alternatively two, four, five, six, seven or more), turns is provided.

FIG. 9G shows a further embodiment of a contactless smart card module arrangement with yet another booster antenna 922; this differs from the booster antenna 908 described in FIG. 9C substantially in that, instead of the second conductor loop 904, a coil 918 with a plurality of, for example three (alternatively two, four, five, six, seven or more), turns is provided.

FIG. 9H shows a further embodiment of a contactless smart card module arrangement with yet another booster antenna 924; this differs from the booster antenna 914 described in FIG. 9D substantially in that, instead of the second conductor loop 904, a coil 918 with a plurality of for example three (alternatively two, four, five, six, seven or more), turns is provided.

FIG. 9I shows a further embodiment of a contactless smart card module arrangement with yet another booster antenna 926; this differs from the booster antenna 906 described in FIG. 9B substantially in that, instead of the first conductor loop 902, a coil 928 with a plurality of, for example three (alternatively two, four, five, six, seven or more), turns is provided. On the left-hand side of the booster antenna 926, the innermost turn of the coil 928 is interrupted. Two lines running parallel to one another in the direction of the coil center point and forming a plate capacitor, namely the first capacitor 408, are arranged at the interruption point.

FIG. 9J shows a further embodiment of a contactless smart card module arrangement with yet another booster antenna 930; this differs from the booster antenna 906 described in FIG. 9D substantially in that, instead of the first conductor loop 902, a coil 928 with a plurality of, for example three (alternatively two, four, five, six, seven or more), turns is provided. In addition, the first end 910 of the coil 928 is not in the form of a T, but is connected to a spur line, which runs in the direction of the center point of the coil 928 and runs parallel to the spur line which extends from the first end 910 of the second conductor loop 904 radially in the direction of the central turn of the coil 928. The spur line which runs from the first end 910 of the coil 928 in the direction of the coil center point runs, over its entire extent, parallel to the spur line which runs from the first end 910 of the second conductor loop 904 radially in the direction of the central turn of the coil 928.

FIG. 9K shows a further embodiment of a contactless smart card module arrangement with yet another booster antenna 932; this differs from the booster antenna 906 described in FIG. 9J substantially in that, instead of the second conductor loop 904, likewise a further coil 934 with a plurality of, for example three (alternatively two, four, five, six, seven or more), turns is provided.

FIG. 9L shows a further embodiment of a contactless smart card module arrangement with yet another booster antenna 936; this differs from the booster antenna described in FIG. 9B in that the first end 910 of the first conductor loop 902 is connected to the second end 938 of the second conductor loop 904, and the second end 912 of the first conductor loop 902 is connected to the first end 940 of the second conductor loop 904. This has the effect that the currents in the conductor loops are rectified with respect to one another and, as a result, also the magnetic fields passing through the conductor loops 902, 904 are rectified with respect to one another. The lines connecting the ends 910, 912, 938, 940 of the conductor loops 902, 904 run substantially parallel to one another and form a plate capacitor in this region. In the region of the ends 910, 912 of the first conductor loop 902, the lines connecting the conductor loop ends cross one another.

FIG. 9M shows a further embodiment of a contactless smart card module arrangement with a booster antenna 906; this differs from the booster antenna described and shown in FIG. 9A substantially by the illustration of all components. In contrast to in FIG. 9A, the two conductor loops 902 and 904 in this illustration are rectangular. The booster antenna is in this case formed with conductor tracks in two different planes (blue and gray). The two planes one above the other form the previously described plate capacitors again at the points 408 and 406. The connections or vias of the two conductor track planes with respect to one another are illustrated by means of black squares 940.

FIG. 9O shows a further embodiment of a contactless smart card module arrangement with yet another booster antenna 936; this differs from the booster antenna described in FIG. 9M in that the two conductor tracks of the conductor loops 902 and 904, as described in FIG. 9L, are cross-connected. This has the effect that the currents in the conductor loops are rectified with respect to one another and, as a result, the magnetic fields passing through the conductor loops 902, 904 are also rectified with respect to one another.

As has been described above, in general the first electrical circuit 402 and the second electrical circuit 404 can be designed in such a way that the first phase resonance (i.e. the phase resonance of the first electrical circuit 402) and the second absolute resonance (i.e. the absolute resonance of the second electrical circuit 404) are identical. The first electrical circuit 402 and the second electrical circuit 404 can be designed (in other words dimensioned) in such a way that the first phase resonance and/or the second absolute resonance are/is approximately 13.56 MHz.

The booster antenna in accordance with various configurations can be designed and dimensioned in such a way that the smart card can be operated in the HF frequency range or in the UHF frequency range.

Figure 10:
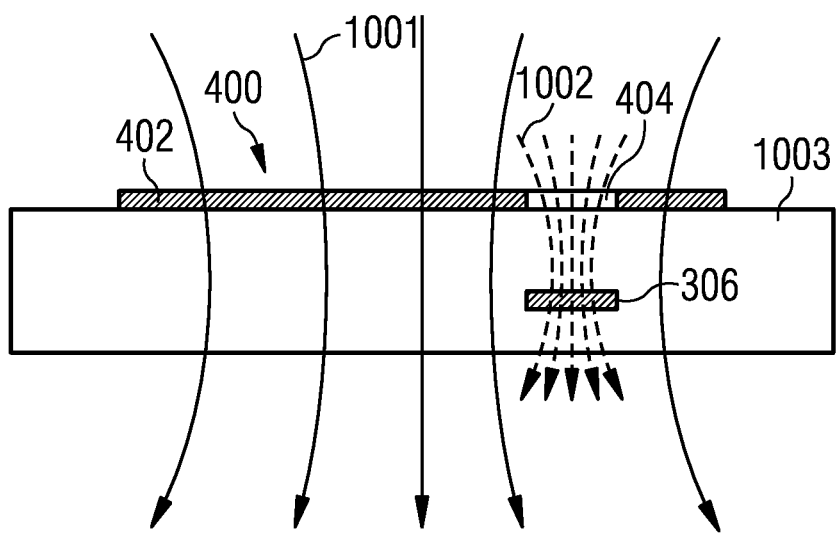
FIG. 10 shows an additional use area for a booster antenna.

FIG. 10 shows a further use area for booster antennas. FIG. 10 illustrates that the CoM (coil on module) or OCA (on-chip antenna) 306 does not necessarily need to be in the direct vicinity of the coupling element 404. If the booster antenna 400 is positioned on an object 1003, communication via the magnetic field 1002 can be set up by the CoM (coil on module) or OCA (on-chip antenna) 306, provided that the object 1003 does not completely damp the magnetic field. Thus, communication with a device from which a weak field 1001 emanates can be ensured.

The module 306 in FIG. 10 could also be configured as an implanted device, which communicates with another device, for example by means of a patch-like booster antenna 400.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A booster antenna for a chip arrangement, wherein the booster antenna comprises:
a first electrical circuit, which forms a first resonant circuit with a first phase resonance; and
a second electrical circuit, which forms a second resonant circuit with a second absolute resonance;
wherein the first electrical circuit and the second electrical circuit are coupled to one another.

2. The booster antenna of claim 1,
wherein the first electrical circuit and the second electrical circuit are designed such that the first phase resonance and the second absolute resonance are identical.

3. The booster antenna of claim 1,
wherein the first electrical circuit and the second electrical circuit are designed such that at least one of the first phase resonance and the second absolute resonance are/is approximately 13.56 MHz.

4. The booster antenna of claim 1,
wherein the second electrical circuit has an inductive coupling structure.

5. The booster antenna of claim 1,
wherein the first electrical circuit is connected in series with the second electrical circuit.

6. The booster antenna of claim 1,
wherein the first resonant circuit and the second resonant circuit are designed such that a first current in the first resonant circuit effects an increased second current, in comparison with the first current, in the second resonant circuit.

7. The booster antenna of claim 1,
wherein the first resonant circuit is a series resonant circuit.

8. The booster antenna of claim 1,
wherein the second resonant circuit is a parallel resonant circuit.

9. The booster antenna of claim 1,
wherein the first electrical circuit comprises or consists of a series circuit comprising a first inductance, a first capacitance and a first ohmic resistance.

10. The booster antenna of claim 1,
wherein the second electrical circuit comprises or consists a parallel circuit comprising a second capacitance and a series circuit, wherein the series circuit has or comprises a second ohmic resistance and a second inductance.

11. The booster antenna of claim 9,
wherein the series circuit comprising the first inductance, the first ohmic resistance and the first capacitance is connected in parallel with the second capacitance.

12. The booster antenna of claim 9,
wherein the first ohmic resistance is formed by the ohmic resistance of the first inductance.

13. The booster antenna of claim 10,
wherein the second ohmic resistance is formed by the ohmic resistance of the second inductance.

14. The booster antenna of claim 1, further comprising:
a flexible carrier;
wherein the first electrical circuit and the second electrical circuit are arranged on the flexible carrier.

15. A contactless chip arrangement, comprising:
a booster antenna, comprising:
a first electrical circuit, which forms a first resonant circuit with a first phase resonance; and
a second electrical circuit, which forms a second resonant circuit with a second absolute resonance;
wherein the first electrical circuit and the second electrical circuit are coupled to one another;
a contactless chip module, comprising:
a chip; and
a coil, which is electrically coupled to the chip;
wherein the booster antenna is inductively coupled to the coil of the contactless chip module, by means of at least one inductive coupling region of the booster antenna.

16. The contactless chip arrangement of claim 15,
wherein the booster antenna has at least one further coupling region for coupling to at least one of a write device and a read device.

17. The contactless chip arrangement of claim 15,
wherein the first electrical circuit forms the further coupling region for coupling to at least one of a write device and a read device.

18. The contactless chip arrangement of claim 15,
wherein the inductive coupling region is part of the second electrical circuit; and
wherein the inductive coupling region is arranged substantially congruently with the contactless chip module.

19. The contactless chip arrangement of claim 15,
wherein the further coupling region for coupling to at least one of a write device and a read device is formed by a dipole.

20. The contactless chip arrangement of claim 15,
wherein the inductive coupling region of the booster antenna for coupling to a chip is arranged completely within the further coupling region for coupling to at least one of a write device and a read device is formed by a dipole.

21. The contactless chip arrangement of claim 15,
wherein the inductive coupling region of the booster antenna for coupling to a chip is arranged completely outside the further coupling region for coupling to at least one of a write device and a read device.

22. The contactless chip arrangement of claim 15,
wherein the contactless chip module further comprises chip contacts, which are designed to provide a contact-based chip interface.

23. The contactless chip arrangement of claim 15,
designed as a dual-interface chip module arrangement.

24. A chip arrangement, comprising:
a chip module arrangement, comprising:
  a contactless chip arrangement, comprising:
  a booster antenna, comprising:
    a first electrical circuit, which forms a first resonant circuit with a first phase resonance; and
    a second electrical circuit, which forms a second resonant circuit with a second absolute resonance;
  wherein the first electrical circuit and the second electrical circuit are coupled to one another;
  a contactless chip module, comprising:
  a chip; and
  a coil, which is electrically coupled to the chip;
  wherein the booster antenna is inductively coupled to the coil of the contactless chip module, by means of at least one inductive coupling region of the booster antenna.

* * * * *